United States Patent [19]

Terneu et al.

[11] Patent Number: 4,900,634
[45] Date of Patent: Feb. 13, 1990

[54] METHOD OF COATING GLASS AND COATED FLAT GLASS

[75] Inventors: Robert Terneu, Thiméon; Albert Van Cauter, Charleroi, both of Belgium

[73] Assignee: Glaverbel, Brussels, Belgium

[21] Appl. No.: 129,961

[22] Filed: Dec. 4, 1987

[30] Foreign Application Priority Data

Dec. 23, 1986 [GB] United Kingdom ............... 8630791

[51] Int. Cl.$^4$ .............................................. E04B 1/62
[52] U.S. Cl. ..................................... 428/432; 428/333
[58] Field of Search ............... 428/432, 433, 688, 689, 428/702, 333, 34, 38

[56] References Cited

U.S. PATENT DOCUMENTS

| | | |
|---|---|---|
| 4,125,391 | 11/1978 | van Laethem . |
| 4,172,159 | 10/1979 | Marcault ........................ 427/168 X |
| 4,584,236 | 4/1986 | Colmon et al. ................. 428/432 X |
| 4,590,096 | 5/1986 | Lindner ........................ 427/166 X |
| 4,598,023 | 7/1986 | Van Laethem et al. ............ 428/432 |
| 4,642,130 | 2/1987 | Hargreaves et al. ............ 427/422 X |
| 4,687,687 | 8/1987 | Teineu et al. ................. 428/432 X |
| 4,707,383 | 11/1987 | Mattes et al. ................. 427/166 X |
| 4,737,388 | 4/1988 | Lindner ........................ 428/34 |
| 4,743,506 | 5/1988 | Russo et al. .................. 428/432 X |

FOREIGN PATENT DOCUMENTS

| | | |
|---|---|---|
| 866332 | 4/1961 | United Kingdom . |
| 871311 | 6/1961 | United Kingdom . |
| 1069942 | 5/1967 | United Kingdom . |
| 1166285 | 10/1969 | United Kingdom . |
| 1265100 | 3/1972 | United Kingdom . |
| 1517341 | 7/1978 | United Kingdom . |
| 1533919 | 11/1978 | United Kingdom . |
| 1547719 | 6/1979 | United Kingdom . |
| 1555081 | 11/1979 | United Kingdom . |
| 1556195 | 11/1979 | United Kingdom . |
| 1565765 | 4/1980 | United Kingdom . |
| 2033357 | 5/1980 | United Kingdom . |
| 2039865 | 8/1980 | United Kingdom . |
| 1598924 | 9/1981 | United Kingdom . |

Primary Examiner—Nancy A. B. Swisher
Attorney, Agent, or Firm—Spencer & Frank

[57] ABSTRACT

A method is disclosed of forming a pyrolytic tin oxide coating on a face of a hot glass substrate during transport of the glass through a coating station into which a coating precursor solution containing a tin compound is sprayed so that the glass is contacted by material from which the tin oxide coating is formed by pyrolysis. The coating is formed by spraying a solution containing at least two additives. These additives and their amounts, and the thickness to which the coating is formed, are selected so that the coating contains doping atoms and has an emissivity in respect of infra-red radiation having wavelengths greater than 3 micrometers of at most 0.3 and a specific internal haze factor of at most 1.5.

The additives dissolved in the coating precursor solution may be selected from at least two of the following groups A, B and C, wherein group A consists of compounds which will result in the coating containing fluorine, group B consists of compounds which will result in the coating containing at least one of antimony, arsenic, vanadium, cobalt, zinc, cadmium, tungsten, tellurium, indium, molybdenum and manganese, and group C consists of oxidizing agents.

20 Claims, No Drawings

METHOD OF COATING GLASS AND COATED FLAT GLASS

BACKGROUND OF THE INVENTION

1. Field of the Invention

This invention relates to a method of forming a pyrolytic tin oxide coating on a face of a hot glass substrate during transport of the glass through a coating station into which a coating precursor solution containing a tin compound is sprayed so that the glass is contacted by material from which the tin oxide coating is formed by pyrolysis. The invention also includes flat glass bearing a pyrolytic tin oxide coating.

2. Description of the Related Art

For many applications, for example for window glazings, the coating should be colourless, or it should at least have a colour which is aesthetically acceptable. Because the optical thicknesses of such coatings as may be used are comparable with the wavelength of light, the coatings tend to be coloured in reflection due to interference effects. Such interference effects tend to be more pronounced in relatively thin coatings. It has been found that coatings which exhibit a slight blue or green coloration are much more acceptable commercially than those exhibiting other colours.

It is well known to provide tin oxide coated glass. Tin oxide coatings may be rendered conductive so that the coating reduces the emissivity of the coated glass in respect of long wavelength infra-red radiation, in particular radiation having wavelengths greater than 3 micrometers.

It is known to render tin oxide coatings conductive by incorporating doping agents, and they may also include minor proportions of other compatible materials for various purposes. The nature and amount of any atoms present other than tin and oxygen should not exceed a limit above which the crystal lattice structure type of the coating differs from that of cassiterite, so as to preserve the transparency and durability of the coating. A simple, and perhaps simplistic, explanation of doping is that atoms are provided which are compatible with the tin oxide crystal lattice, and which have a different valency shell from both tin and oxygen. As a result, the doping atoms provide spare electrons, or electron gaps which can act as charge carriers through the coating.

The most common doping agent is fluorine which can replace oxygen. Fluorine has 7 electrons in its valency shell while oxygen has 6. An alternative doping agent which has been proposed is antimony. It should be noted however that antimony is known to have a strong colouring effect on tin oxide coatings, so it is not normally used as a doping agent in coatings of transparent glazings, especially when a high total luminous transmission is required.

It should be borne in mind that the tin oxide coating will rarely be stoichiometrically pure tin dioxide. There are almost certain to be some tin atoms in the lower valency state and some unfilled oxygen positions in the tin oxide lattice. In fact it has been noted that at high temperatures a tin oxide coating may be conductive even without a doping agent. It may be that a doping agent, when present, combines in some way with such oxygen gaps in order to achieve conductivity. In any event, the present invention does not depend for its usefulness on any theory of the doping mechanism.

Such coated glass is often used for glazing purposes to provide a measure of heat conservation, and also to provide a heat screen, for example a solar screen. Most solar radiation energy is at relatively short wavelengths, so that it can be transmitted by the coated glass provided that the coating and the glass are clear, but radiant energy from the interior of the glazed structure tends to be at longer wavelengths, so it is inhibited from escaping from the structure through the coated glazing. Such coatings are often made to a thickness in the range 200 nm to 800 nm.

It is known that such coatings should desirably fulfill certain criteria.

The reduction in emissivity should be substantial in order that the heat gain should be economically worthwhile having regard to the additional cost involved in coating the glass. This tends to imply a rather thick coating in order that the necessary conductivity in the coating can be achieved.

The coated glass should be priced at a level which allows such savings, so it should not be too expensive to manufacture.

The coating should be transparent, that is of low haze, and any haze that is present should be uniform over the extent of the coating. This is relatively unimportant in the case for example of greenhouse glazings, but is quite important for glazings for dwellings and is extremely important in the case of vehicle windows in order to allow clear and uniformly clear vision through the coated glass. Haze, the visible aspect of diffuse light transmission, may be due to surface rugosity of the coating, but this can be cured by polishing the coating. Haze may also be due to internal defects of the coating, whether at the coating/glass interface, or within the thickness of the coating. It will be appreciated that such internal haze tends to be greater, the greater is the thickness of the coating. The requirement for low haze is therefore at odds with the requirement for low emissivity.

There are various coated glass products on the market.

One such product comprises float glass on which a tin oxide coating some 750 nm to 800 nm in thickness has been formed pyrolytically. This coating has excellent low emissivity, less than 0.2. Such low emissivity is in fact as good as can be achieved by applying a coating by a sputtering technique. The coating also has good colour in reflection, in that it is a barely perceptible green. But because of its thickness, and also due to formation of the coating by pyrolysis, this coating has a level of haze which, while it is commercially acceptable for many purposes, is not as good as it could be. Some contrast in the haze over the extent of the coating area may also be apparent on inspection. When this coating is polished so as substantially to eliminate surface haze, any residual haze may be attributed to defects below the surface of the coating. This residual haze is referred to herein as internal haze. This known coating has an average internal haze value of 2%.

References to "internal haze" throughout this specification are references to internal haze measured according to American Standard ASTM D 1003-161. References to "emissivity" throughout this specification are references to normal emissivity as defined in Section 5.1.1. of Belgian Standard NBN N 62-004 (1987).

It will be appreciated that one would expect the internal haze of such a coating to increase with increase in its thickness, so comparing actual haze values can be misleading. A more direct comparison can be made by dividing the percentage haze value by the thickness of the coating expressed in micrometers to give a factor for specific internal haze. If this is done, it will be noted that the previously known coating has a specific internal haze factor of more than 2.5. Specific internal haze factors of more than 2.5 are typical of known pyrolytic tin oxide coatings.

SUMMARY OF THE INVENTION

The present invention is based on our discovery that for any given pyrolytic coating technique, it is possible to reconcile the requirements for low infra-red emissivity and low haze by a suitable choice of coating precursor solution, and it is an object of the present invention to provide a new method of forming a pyrolytic tin oxide coating of low emissivity and of improved specific internal haze.

According to the present invention, there is provided a method of forming a pyrolytic tin oxide coating on a face of a hot glass substrate during transport of the glass through a coating station into which a coating precursor solution containing a tin compound is sprayed so that the glass is contacted by material from which the tin oxide coating is formed by pyrolysis, characterised in that the coating is formed by spraying a solution containing at least two additives, these additives and their amounts, and the thickness to which the coating is formed, being selected so that the coating contains doping atoms and has an emissivity in respect of infra-red radiation having wavelengths greater than 3 micrometers of at most 0.3 and a specific internal haze factor of at most 1.5.

The adoption of the present invention results in the formation of a coating which tends to have relatively low internal haze for a given coating thickness, while still allowing the achievement of low emissivity values. It has also been found that such haze as there may be tends to be rather uniform across the coated area, so promoting low haze contrast.

The reasons why this should be so are not at present clear.

When comparing a process according to the invention with an otherwise similar process in which the coating precursor solution simply consists of the dissolved tin compound and a single dissolved additive selected to provide a doping agent in the coating, there is expected to be an improvement in haze no matter how the coating precursor material is caused to contact the glass substrate. It will be appreciated however that it is most desirable to make use of a coating technique which is inherently capable of forming coatings having low internal haze.

It is accordingly recommended to make use of a coating process and apparatus such as is disclosed in any of the following British Patent publications: No GB 2.184.748A, No GB 2.185.249 A, No GB 2.185.250 A and No GB 2.187.184 A.

Advantageously, the solution which is sprayed is an aqueous solution of stannous chloride. Hydrated stannous chloride is particularly recommended because of its low cost and ease of use.

In the most preferred embodiments of the invention, the coating precursor solution contains dissolved additives selected from at least two of the following groups A, B and C, wherein group A consists of compounds which will result in the coating containing fluorine, group B consists of compounds which will result in the coating containing at least one of antimony, arsenic, vanadium, cobalt, zinc, cadmium, indium, tungsten, tellurium, molybdenum and manganese, and group C consists of oxidising agents.

The adoption of the invention has certain other advantages which were also entirely unexpected, and which are of considerable economic benefit.

In commercially operated pyrolytic flat glass coating processes, while it is possible to coat individual glass sheets, it is more economic to coat a ribbon of freshly formed glass while it is still hot so as to avoid reheating costs. This is done by causing the ribbon to travel through a coating station. Naturally coating precursor material will be fed to the coating station at the maximum rate which is consistent with a good quality coating of the desired thickness on glass which is travelling at a given speed. The actual formation of the coating requires the glass to be within the coating station for a given time which depends inter alia on the coating thickness required. It is thus possible that the speed of glass production can be limited by the requirements of a high quality coating of a given thickness. We have found that the adoption of the present invention can in some circumstances permit the achievement of low emissivity with thinner coatings than has hitherto been thought necessary, and that as a result the production rate of the coated glass can be increased with consequent savings, in addition to the saving of coating precursor material due to the reduced thickness of the coating.

By way of example, in order to achieve an emissivity of less than 0.2, we have previously coated glass to a thickness in excess of 700 nm in a particular plant which was run at a given production rate. We have now found that we are able to run the same plant at a higher rate when coating the glass to a thickness of 450 nm by a process in accordance with this invention, and that we can still achieve an emissivity value of less than 0.2.

We have also found that the resulting product exhibits a notable improvement in internal haze. The resulting coatings were polished in the same way so as substantially to eliminate surface rugosity and thus haze due to surface effects. Any residual haze was attributed to defects beneath the surface of the coating and is referred to herein as internal haze. The previously used coating had a haze value of 2%, whereas the coating formed in accordance with this invention had a haze value of 0.5%, and this low level of haze was not visible under ordinary conditions. It will be noted that the previously known coating has a specific internal haze factor of over 2.5, while the coating according to the invention has a specific internal haze factor of 1.11.

A further important and extremely surprising advantage of at least some processes in accordance with the present invention is as follows. When operating a commercial coating process in which the glass to be coated travels through a coating station, it has been noted that for various reasons, the margins of the glass which travel closer to the side walls of the coating station tend to be coated to a lower quality than the central portions of the glass. There may thus result a central strip of glass which is coated to a good quality, while the margins of the glass are unacceptable. These margins are therefore to be treated as waste, and may be recycled as cullet. But an allowance must be made for this waste when costing the good quality product. Inexplicably, we have found that the adoption of the present invention can lead to a very substantial reduction in the width of the waste margins of the coated glass, in some cases to a quarter or even less of what it was before.

The adoption of the present invention, in at least some of its embodiments, thus enables a product of higher quality to be made at lower cost.

Preferably, the fluorine compound of group A is ammonium bifluoride. This compound is not expensive and it gives rise to gaseous decomposition products which, apart from the fluorine, do not become incorporated into the coating. In fact rather a high proportion of the fluorine itself tends to escape into the atmosphere of the coating chamber, so it is preferred to use an excess of ammonium bifluoride in order to ensure that a sufficient quantity of fluorine doping atoms becomes incorporated.

Advantageously, the fluorine compound(s) of group A is or are present in such an amount as to result in the coating containing at most 1.3 atoms percent fluorine relative to tin atoms in the coating. We have found that the use of fluorine in excess of 1.3 atoms % in the coating does not result in a commensurate increase in coating conductivity, and it may have a deleterious effect on the structure and quality of the coating.

While all the elements resulting from the use of a said additive in group B, namely, antimony, arsenic, vanadium, cobalt, zinc, cadmium, indium, tungsten, tellurium, molybdenum and manganese, have the effect of increasing the conductivity of a coating in which they are incorporated, antimony is the most preferred.

Preferably, a said compound of group B being an antimony compound, preferably antimony chloride, is incorporated in the solution which is sprayed. We have found that the use of antimony, especially when combined with fluorine, is particularly valuable in promoting low internal haze in tin oxide coatings.

It is advantageous also to limit the amount of antimony which is to be incorporated into the coating, if a coating of high light transmissivity is required. Accordingly in some preferred embodiments of the invention, the solution which is sprayed contains at most 5 atoms percent antimony relative to tin atoms. Such low levels of antimony in the solution result in the incorporation of amounts of antimony in the coating which still allow a good light transmissivity of the coating.

For some purposes however, it is desirable to reduce light transmission through the coating. An example is the case of greenhouses for use in hot dry climates. While a greenhouse is desirable for containing an atmosphere of relatively high humidity, and for protecting plants against low ambient temperatures which may be experienced at night, unless solar radiation is cut down during the day, there is a risk that the plants may become withered.

There are various oxidising agents which may be used in performing a process according to the invention, but the most preferred oxidising agents are those which evaporate or decompose without leaving any residue which would tend to mar the coating, and in particular those which will give rise to reaction products which may already be present due to the reactions of the other coating precursor materials, such as tin chloride and ammonium bifluoride if these are used. Especially preferred oxidising agents are those in the group: nitric acid ($HNO_3$), nitrous acid ($HNO_2$), hypochlorous acid ($HClO$), chloric acid ($HClO_3$), perchloric acid ($HClO_4$), iodic acid ($HIO_3$), and periodic acid ($HIO_4$). It is particularly surprising that the use of such oxidising agents should afford the benefits of this invention since they do not give rise to any distinguishable additional adjuvant in the coating.

It is also surprising that the use of a said oxidising agent should give beneficial results because it would be expected that it would promote oxidation of the tin from its divalent to its tetravalent state and thus reduce the number of oxygen gaps in the tin oxide lattice of the coating. According to at least one theory of the doping mechanism this should have the effect of reducing the conductivity of the coating, so leading away from a low infra-red emissivity.

Preferably, the coating is deposited so that it has a said emissivity in respect of infra-red radiation of at most 0.2. Low emissivity is beneficial for heat conservation.

Advantageously, the coating is deposited so that it has thickness which lies in the range 200 nm to 800 nm, and preferably in the range 400 nm to 500 nm. Thinner coatings tend to have lower internal haze, but lower conductivity and thus greater emissivity, and they also tend to be more strongly coloured in reflection. The converse is partly true of thicker coatings. We have found that by adopting this invention we can achieve, with a coating having a thickness in the range 400 nm to 500 nm, an emissivity which has hitherto been associated with coatings say 800 nm thick, while at the same time achieving a haze value which is even lower than that which has previously been associated with a coating only 200 nm thick. It will be appreciated that coatings in the range 400 to 500 nm thick have a strength of coloration due to interference effects which is intermediate that of the coatings 200 nm and 800 nm thick, but that there is ample room in that range for adjusting the thickness of the coating to achieve an aesthetically acceptable colour.

The invention includes flat glass coated by a method as herein defined, and the invention extends to any flat glass bearing a pyrolytic tin oxide coating characterised in that such coating includes at least two adjuvants, the nature and amount of such adjuvants in the coating, and the thickness of the coating, being such that the coating has an emissivity in respect of infra-red radiation having wavelengths greater than 3 micrometers of at most 0.3 and a specific internal haze factor of at most 1.5.

We have found that the incorporation of said adjuvants in a tin oxide coating can be beneficial for the achievement of low internal haze in the coating, and also for a low haze contrast across the coating. The use of such adjuvants also promotes good conductivity in the coating, and thus a low emissivity, even for relatively thin coatings. We have found that these advantages can be afforded in large scale manufacture at high speed, such as is required for economic commercial production. It is surprising that haze can be reduced by the incorporation of two adjuvants. It was previously thought that the use of more than one adjuvant, required to render the coating conductive, would in fact promote haze in the coating.

Advantageously, said coating has a specific internal haze factor (measured as the actual internal haze percent divided by the coating thickness in micrometers) of at most 1, so as to promote clear vision through the coated glass.

Advantageously, the emissivity of the coating in respect of infra-red radiation having wavelengths longer than 3 micrometers is at most 0.2. Low emissivity is beneficial for heat conservation.

Preferably, fluorine is present in said coating in an amount of at most 1.3 atoms percent relative to tin atoms, and advantageously, fluorine is present in said coating in an amount of between 0.1 and 1.0 atoms percent relative to tin atoms. The incorporation of excessive amounts of fluorine is wasteful and therefore uneconomic, and it can even be deleterious for coating quality. We have found that amounts as little as 0.1 atoms % give very good results, and in fact in specific preferred embodiments of the invention, amounts of between 0.2 and 0.3 atoms percent fluorine relative to tin are used.

Advantageously, such coating includes fluorine together with at least one other adjuvant selected from the group consisting of antimony, arsenic, vanadium, cobalt, zinc, cadmium, indium, tungsten, tellurium, molybdenum and manganese.

We have found that the incorporation of fluorine and a said other adjuvant in a tin oxide coating can be particularly beneficial for the achievement of low internal haze in the coating, and also for a low haze contrast across the coated area.

In the most preferred embodiments of the invention, antimony is present as the or a said other adjuvant in said coating. The combined use of fluorine and antimony as said adjuvants gives especially beneficial results for the purposes in view.

For the best results, we have found that the number of antimony atoms in said coating should be between 5 and 15 times the number of fluorine atoms in the coating.

Preferably, the thickness of the coating lies in the range 200 nm to 800 nm, and most preferably in the range 400 nm to 500 nm. As has been explained, thinner coatings tend to have lower internal haze, but lower conductivity and thus greater emissivity, and they also tend to be more strongly coloured in reflection. The converse is partly true of thicker coatings. We have found that by adopting this invention we can achieve, with a coating having a thickness in the range 400 nm to 500 nm, an emissivity which has hitherto been associated with coatings say 800 nm thick, while at the same time achieving a haze value which is even lower than that which has previously been associated with a coating only 200 nm thick. It will be appreciated that coatings in the range 400 to 500 nm thick have a strength of coloration due to interference effects which is intermediate that of the coatings 200 nm and 800 nm thick, but that there is ample room in that range for adjusting the thickness of the coating to achieve an aesthetically acceptable colour.

Clear vision through the coated glass is also promoted if, as is preferred, said coating has an (actual) internal haze of at most 1% and preferably at most 0.5%.

It has ben noted that pyrolytic coating processes tend to result in a coating which has a surface which is rather rugose. If left as it is, this would result in a certain level of haze due to the surface form of the coating. This is however considered to be of only minor importance, since such surface rugosity can be removed quite easily by a polishing process substantially to eliminate surface haze and leave only residual internal haze. In the most preferred embodiments therefore, a said pyrolytic coating is polished and the coated glass has a total diffuse light transmission of at most 1% and preferably at most 0.5%.

Such products are of especial value in cases where clarity of vision is important for safety or other reasons. One such case is that of vehicle windscreens, where a low diffuse transmission is particularly important for comfort and safety when driving at night in the face of oncoming vehicle headlights. The invention thus includes such embodiments wherein the coated glass is constituted as a vehicle window, and in particular as a vehicle windscreen.

Tin oxide coated vehicle windows are described and claimed in our copending application No . . . (which claims priority from British patent application Ser. No. 86 24.825) published under No . . . A.

In preferred embodiments of the invention, the coated glass is comprised within a multiple glazing panel. The use of a multiple glazing panel affords additional benefits in heat conservation.

In some preferred embodiments, said coating is formed on coloured glass. The use of coloured glass, which expression includes grey or neutrally coloured glass, is advantageous in circumstances where it is desired to reduce glare. It may be desirable to reduce glare purely for reasons of comfort. Particular examples of the use of coated coloured glass are in the field of vehicle windows. A transparent sun-roof or vehicle rear window may be made of coated coloured glass to reduce overheating of the vehicle interior by solar radiation. For this purpose, the glass should be installed with its coating facing the interior of the vehicle.

DESCRIPTION OF THE PREFERRED EMBODIMENT

Preferred embodiments of the invention will now be described by way of Example.

EXAMPLE 1

This Example makes use of the apparatus illustrated in FIG. 1 of the said British Patent publication No GB 2.187.184 A, set up as described in relation to that Figure. Example 1 of that specification was modified as follows:

Air discharge into the coating chamber: 6000 Nm3 at 550° C.

Aspiration rate: regulated to build up a coating 450 nm thick.

Spray nozzle reciprocation rate: 22 cycles per minute.

Spray discharge rate: regulated to bulid up a coating 450 nm thick.

Coating precursor solution: aqueous containing per liter
900 g $SnCl_2$
65 g $NH_4F.HF$
40 g $SbCl_3$.

The sprayed solution reacted to form a pyrolytic tin oxide coating on the glass (6 mm thick float) which coating contained about 0.1 to 0.2 atoms % fluorine in relation to tin, and about 15 times that amount of antimony.

The resulting coated flat glass had the following properties.

| | |
|---|---|
| Total visible light transmission | 73% |
| Emissivity | 0.18 |
| Internal haze | 0.3% |
| Internal haze factor | 0.67 |
| Contrast in haze | not visible |

By way of comparison, for a process which is identical save that the antimony chloride is omitted from the coating precursor solution, results in coated flat glass having the following properties.

| | |
|---|---|
| Total visible light transmission | 77% |
| Emissivity | 0.18 |
| Internal haze | 0.8% |
| Internal haze factor | 1.78 |
| Contrast in haze | visible |

EXAMPLE 2

Example 1 was repeated save that the rate at which hot air was blown into the coating chamber, and the spraying rate were adjusted to form a coating 750 nm in thickness.

After the coating was formed and the coated ribbon cut into sheets, the coating was found to exhibit slight rugosity resulting in surface haze.

Accordingly, the coating was subjected to a polishing treatment to remove this surface haze. The coating was polished by a medium consisting of gamma-alumina (Moh hardness 8.0) having a mean grain size of 0.1 micrometer. The alumina was applied to the coating after the latter had been wetted, and was rubbed over the coating by a battery of foam pads. At the end of this treatment the coated sheet was rinsed and dried. The surface rugosity of the coating was very low, and surface haze was substantially eliminated, leaving a certain small residual haze due to the internal haze of the coating. The thickness of the coating was substantially unchanged.

After polishing as described, the resulting coated flat glass had the following properties.

| | |
|---|---|
| Total visible light transmission | 60% |
| Emissivity | 0.18 |
| Total haze | 0.9% |
| Internal haze factor | 1.2 |
| Contrast in haze | almost invisible |

By way of comparison, a process which is identical, save that the antimony chloride is omitted from the coating precursor solution, results in coated flat glass having the following properties after polishing.

| | |
|---|---|
| Total visible light transmission | 75% |
| Emissivity | 0.16 |
| Total haze | 2% |
| Internal haze factor | 2.67 |
| Contrast in haze | clearly visible |

EXAMPLE 3

This Example makes use of the apparatus illustrated in FIG. 11 of the said British Patent publication No GB 2.184.748 A, set up as described in relation to that Figure. Example 5 of that specification was modified as follows:

Glass: 6 mm float ribbon travelling at 8.5 meters per minute

Air discharge into the coating chamber: 5000 Nm3 at 500° C.

Aspiration rate: regulated to build up a coating 450 nm thick.

Spray nozzle reciprocation rate: 25 cycles per minute.

Spray discharge rate: regulated to build up a coating 450 nm thick.

Coating precursor solution: aqueous containing per liter 500 g $SnCl_2$ 150 g $NH_4F.HF$ 25 g $SbCl_3$.

The sprayed solution reacted to form a pyrolytic tin oxide coating on the glass which coating contained about 0.2 atoms percent fluorine in relation to tin, and about 10 times that amount of antimony in relation to tin.

The resulting coated glass had the following properties.

| | |
|---|---|
| Total visible light transmission | 65% |
| Emissivity | 0.19 |
| Internal haze | 0.4% |
| Internal haze factor | 0.89 |
| Contrast in haze | invisible |

By way of comparison, a process which is identical, save that the antimony chloride is omitted from the coating precursor solution, results in coated flat glass having the following properties.

| | |
|---|---|
| Total visible light transmission | 79% |
| Emissivity | 0.18 |
| Internal haze | 2.2% |
| Internal haze factor | 4.89 |
| Contrast in haze | visible |

EXAMPLE 4

This Example makes use of the apparatus illustrated in FIG. 3 of the said British Patent publication No GB 2.185.249 A, set up as described in relation to that Figure. Example 3 of that specification was modified as follows:

Glass: 4 mm ribbon travelling at 11 meters per minute

Glass temperature: 600° C.

Air discharge and aspiration rate: regulated to build up a 450 nm coating.

Spray nozzle reciprocation rate: 35 cycles per minute.

Spray nozzle orientation: 52° to horizontal.

Spray discharge rate: regulated to build up a coating 450 nm thick.

Coating precursor solution: aqueous containing per liter 900 g $SnCl_2$ 65 g $NH_4F.HF$ 30 g $SbCl_3$.

The sprayed solution reacted to form a pyrolytic tin oxide coating on the glass which coating contained about 0.1 to 0.2 atoms percent fluorine in relation to tin, and about 10 times that amount of antimony.

The resulting coated glass had the following properties.

| | |
|---|---|
| Total visible light transmission | 75% |
| Emissivity | 0.16 |
| Internal haze | 0.5% |
| Internal haze factor | 1.11 |
| Contrast in haze | invisible |

Similar results are afforded if the antimony chloride in the coating precursor solution is replaced by 24.2 g arsenic chloride ($AsCl_3$).

By way of comparison, the product of a process which is identical save that the antimony chloride (or arsenic chloride) is omitted from the coating precursor solution had the following properties.

| Total visible light transmission | 80% |
|---|---|
| Emissivity | 0.18 |
| Internal haze | 2% |
| Internal haze factor | 4.44 |
| Contrast in haze | visible |

An antimony containing coated sheet in accordance with this Example has been incorporated into a double glazing unit with a second sheet of glass which was uncoated and was also 4 mm in thickness. The coated face of the first sheet was directed towards the exterior. The glass sheets were held 12 mm apart in a frame and the inter-sheet space was filled with argon at atmospheric pressure. The resulting double glazing panel had a heat transfer coefficient (K coefficient) of 1.6 $W.m^{-2}.K^{-1}$.

EXAMPLE 5

Example 4 was repeated with the difference that the coating precursor solution containing 15 g/L of antimony chloride.

The resulting coated glass had the following properties.

| Total visible light transmission | 77% |
|---|---|
| Emissivity | 0.18 |
| Internal haze | 0.5% |
| Internal haze factor | 1.11 |
| Contrast in haze | invisible |

EXAMPLE 6

Example 3 above was repeated with the following differences.

Air discharge and aspiration rate: regulated to build up a 750 nm coating.

Spray discharge rate: regulated to build up a coating 750 nm thick.

Coating precursor solution: aqueous containing per liter
900 g $SnCl_2$
65 g $NH_4F.HF$
31 mL $HNO_3$ (density 1.57).

The sprayed solution reacted to form a pyrolytic tin oxide coating on the glass which coating contained about 0.1 to 0.2 atoms percent fluorine in relation to tin.

The resulting coated glass had the following properties.

| Total visible light transmission | 72% |
|---|---|
| Emissivity | 0.16 |
| Internal haze | 0.8% |
| Internal haze factor | 1.07 |
| Contrast in haze | invisible |

Similar results are given if the nitric acid is replaced by quantities of hypochlorous acid (HClO) or perchloric acid ($HClO_4$).

By way of comparison, a process which is identical save that the acid is omitted from the coating precursor solution, results in coated flat glass having the following properties.

| Total visible light transmission | 75% |
|---|---|
| Emissivity | 0.16 |
| Internal haze | 2% |
| Internal haze factor | 2.93 |
| Contrast in haze | very clearly visible |

EXAMPLE 7

Example 4 was repeated, but for coating 4 mm coloured glass, again to a thickness of 450 nm.

Coatings were deposited as in Example 4 on glass containing four different sets of colouring agents as follows:

Glass A was a heat absorbing green glass containing iron ions as colouring agent in an amount calculated as about 0.6% in the form $Fe_2O_3$.

Glass B was a similar type of glass but containing rather more iron, about 0.75%, calculated in the same way.

Glass C was a bronze glass containing as colouring agents iron, cobalt and selenium, calculated as $Fe_2O_3$ about 0.35%, Co about 5 ppm (parts per million), and selenium about 10 ppm.

Glass D was also a bronze glass, but containing more colouring agents than glass C, calculated as $Fe_2O_3$ about 0.4%, Co about 15 ppm, and selenium about 15 ppm.

These products are useful as windows for vehicles.

Various light and energy transmitting and reflecting properties of these four glasses were measured, and the results are given in the following table.

In the table:

TL represents the factor of transmission of light of vixible wavelengths

RL represents the factor of reflection of light of visible wavelengths

TE represents the factor of transmission of incident radiant energy, ignoring long wavelength infra-red radiation emitted by the sheet itself RE represents the factor of reflection of incident radiant energy; and TET represents the factor of total energy transmission, that is, the relative intensity of the radiation of all wavelengths (including long wavelength infra-red radiation) on the two sides of the sheet.

The calculation of the luminous properties was made using a radiator whose spectral composition is that of illuminant A as defined by the International Commission on Illumination (reference CIE 17 Section 45-15-145). This illuminant radiates with the spectrum of a black body at a temperature of 2855K and represents car headlights. The calculation of energy properties was made using a radiator whose spectral composition is that of direct sunlight at an elevation of 30° above the horizon. The spectral composition is given in Moon's Table for a mass of air equal to 2.

| GLASS | A | B | C | D |
|---|---|---|---|---|
| TL | 66.7% | 60.7% | 63.9% | 57.7% |
| RL | 12.4% | 11.1% | 11.5% | 12.2% |
| TE | 48.4% | 41.0% | 52.6% | 45.6% |
| RE | 8.2% | 7.2% | 8.5% | 7.4% |
| TET | 59.6% | 54.4% | 62.6% | 57.7% |

What is claimed is:

1. Flat glass bearing a pyrolytic tin oxide coating, comprising:
   a pyrolytic tin oxide coating comprised of at least two adjuvants, which at least two adjuvants include fluorine together with at least one other adjuvant selected from the group consisting of antimony, arsenic, vanadium, cobalt, zinc, cadmium, tungsten, tellurium, molybdenum and manganese, the nature and amount of such adjuvants in the coating, and the thickness of the coating, being effective to provide a pyrolytic tin oxide coating having an emissivity in respect of infra-red radiation having wavelengths greater than 3 micrometers of at most 0.3 and having a specific internal haze factor of at most 1.5.

2. Flat glass according to claim 1, wherein said coating has a specific internal haze factor of at most 1.

3. Flat glass according to claim 1, wherein the emissivity of the coating in respect of infra-red radiation having wavelengths longer than 3 micrometers is at most 0.2.

4. Flat glass according to claim 1, wherein fluorine is present in said coating in an amount of at most 1.3 atoms percent relative to tin atoms.

5. Flat glass according to claim 4, wherein fluorine is present in said coating in an amount of between 0.1 and 1.0 atoms percent relative to tin atoms.

6. Flat glass according to claim 1, wherein antimony is present as an adjuvant in said coating.

7. Flat glass according to claim 6, wherein the number of antimony atoms in the coating is between 5 and 15 times the number of fluorine atoms in the coating.

8. Flat glass according to claim 1, wherein the thickness of the coating ranges from 200 nm to 800 nm.

9. Flat glass according to claim 8, wherein the thickness of the coating ranges from 400 nm to 500 nm.

10. Flat glass according to claim 1, wherein said coating has a specific internal haze factor of at most 1%.

11. Flat glass according to claim 10, wherein said coating is polished and the coated glass has a total diffuse light transmission of at most 1%.

12. Flat glass according to claim 10, wherein said coating has a specific internal haze factor of at most 0.5%.

13. Flat glass according to claim 11, wherein the coated glass has a total diffuse light transmission of at most 0.5%.

14. Flat glass according to claim 11, wherein the coated glass is constituted as a vehicle window.

15. Flat glass according to claim 1, wherein the coated glass is comprised within a multiple glazing panel.

16. Flat glass according to claim 1, wherein said coating is formed on coloured glass.

17. Flat glass bearing a pyrolytic tin oxide coating, comprising:
   tin oxide,
   fluorine and antimony,
   wherein fluorine is present in the coating in an amount of at most 1.3 atom percent relative to tin atoms contained therein,
   wherein the number of antimony atoms in the coating ranges from 5 to 15 times the number of fluorine atoms in the coating, and
   wherein the coating has a thickness effective to provide a flat glass having an emissivity in respect of infra-red radiation having wavelengths greater than 3 micrometers of at most 0.3 and having a specific internal haze factor of at most 1.5.

18. The flat glass according to claim 17, wherein the emissivity in respect of intra-red radiation having wave lengths greater than 3 micrometers is at most 0.2 and wherein the thickness of the coating ranges from 400 nm to 500 nm.

19. Flat glass bearing a pyrolytic tin oxide coating comprising tin oxide, fluorine present in an amount of at most 1.3 atom percent relative to tin atoms, and antimony,
   wherein the number of antimony atoms in the coating ranges from 5 to 15 times the number of fluorine atoms in the coating, and
   wherein the thickness of the coating is such that the flat glass has an emissivity in respect of infra-red radiation having wavelengths greater than 3 micrometers of at most 0.3 and a specific internal haze factor of at most 1.5.

20. The process of employing a pyrolytic tin oxide coated flat glass, comprising:
   installing the pyrolytic tin oxide coated glass as one of a glazing for buildings, a vehicle window and any flat glass application,
   wherein the coating comprises tin oxide and at least two adjuvants, the nature and amount of such adjuvants in the coating, and the thickness of the coatings, being such that the flat glass has an emissivity in respect of infra-red radiation having wavelengths greater than 3 micrometers of at most 0.3 and a specific internal haze factor of at most 1.5.

* * * * *